UNITED STATES PATENT OFFICE.

FRANK RAYMOND, OF GREENVILLE, SOUTH CAROLINA, ASSIGNOR OF ONE-HALF HIS RIGHT TO MICHAEL J. CALNAN, OF SAME PLACE.

IMPROVEMENT IN COMPOSITION ALLOYS.

Specification forming part of Letters Patent No. 186,876, dated January 30, 1877; application filed August 29, 1876.

*To all whom it may concern:*

Be it known that I, FRANK RAYMOND, of the city of Greenville, county of Greenville, and State of South Carolina, have invented a process of melting mica and mixing the same with metals or composition of metals.

The following description forms a full and exact specification, wherein are set forth the nature and principles of the invention, by which the same may be distinguished from others of a similar class.

This invention relates to that class of alloys or metals used as alloys; and it consists in melting mica and mixing the same with any metal or composition of metals while the same is being melted, thereby rendering the metals harder, admitting of better finish, preventing corrosion or rust, less susceptible to effect by fire, heat, or friction, and more durable.

In carrying out my invention, take of mica the quantity necessary to produce the desired effect, and a relative quantity of borax, saltpeter, and soda, or either or any two of them, and place the same in the crucible or furnace, together with the necessary quantity of metal or metals, and melt the whole in the usual way. The borax, saltpeter, and soda will cause the mica to melt, when it will mingle with the metal or metals in the crucible or furnace, producing the effects mentioned above.

In carrying my invention into operation, the ingredients have been compounded in the following proportions: Lead, one part; zinc, one part; mica, two parts. Also, brass, three parts; copper, one part; zinc, one part; lead, one part; mica, four parts. Also, copper, four parts; mica, four parts; tin, one part; lead, one part.

I am aware that mica has been mixed with metals by blowing it in or on the surface while the metal is hot. I do not claim that mode of mixing.

What I claim as my invention is—

A composition consisting of metals or metallic alloys, in combination with mica and fluxes, substantially as described.

In testimony that I claim the foregoing I have hereunto set my hand and seal this 21st day of August, 1876.

FRANK RAYMOND. [L. S.]

Witnesses:
M. F. ANSEL,
M. J. CALNAN.